Patented Aug. 25, 1931

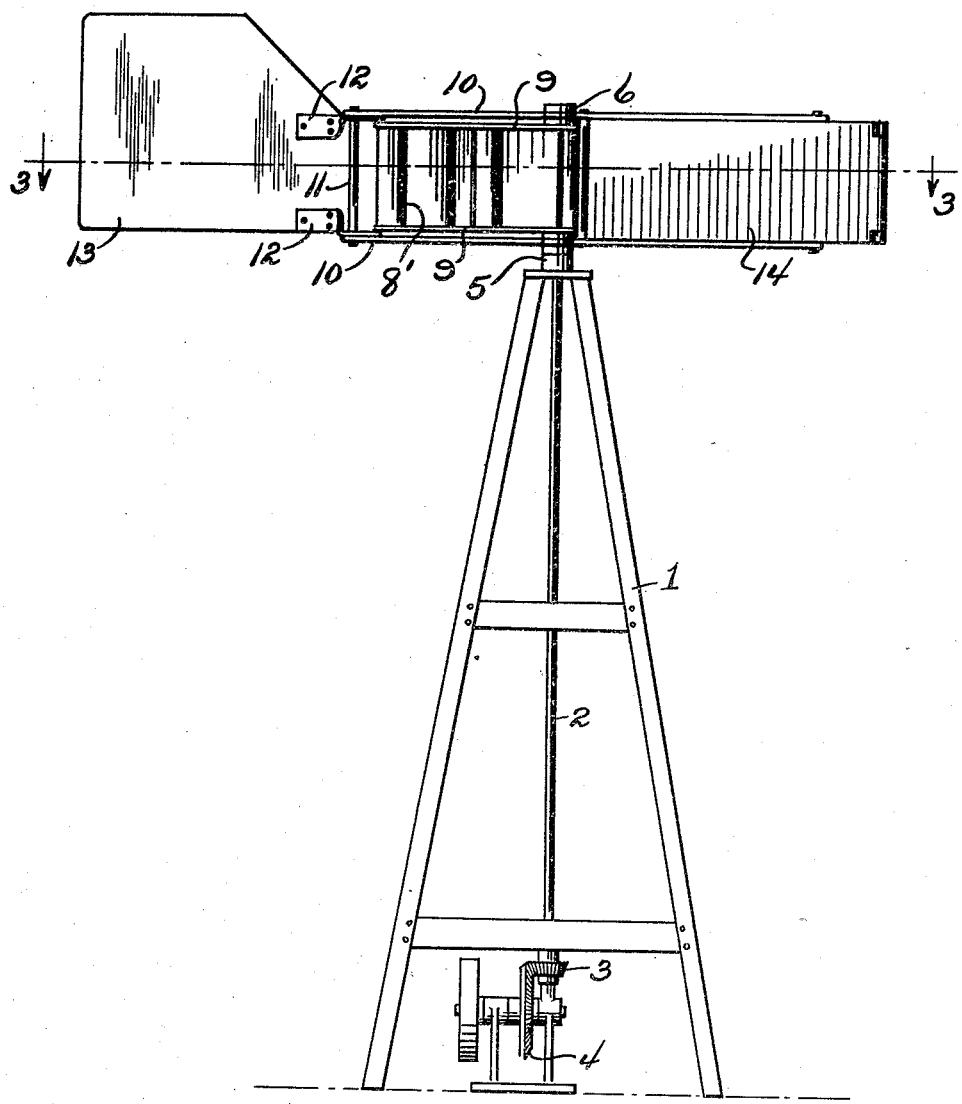

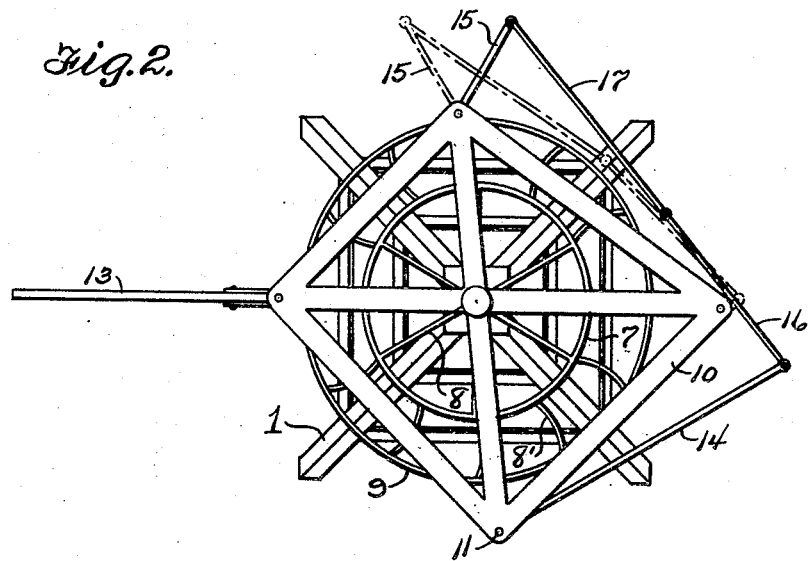
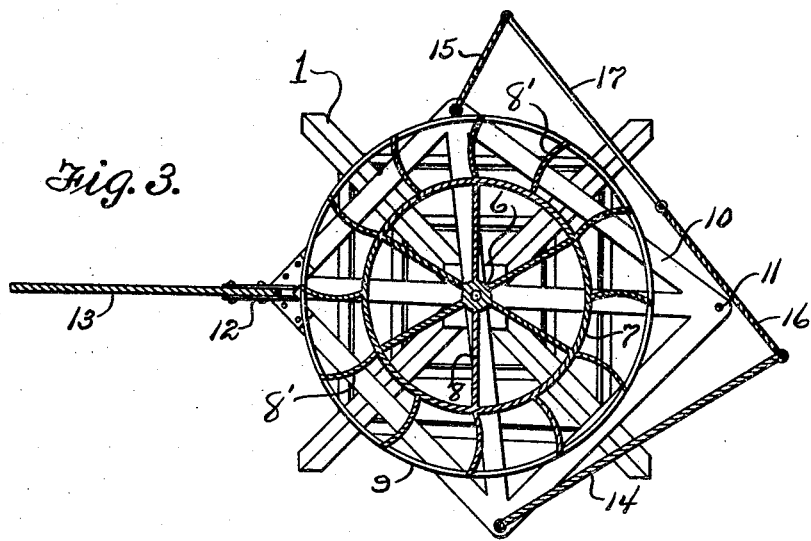

1,820,818

UNITED STATES PATENT OFFICE

WALTER S. McRAE, OF ST. DAVID, ARIZONA

WINDMILL

Application filed January 7, 1930. Serial No. 419,130.

My present invention has reference to a windmill of the turbine type, and my primary object is the provision of means in connection with the wind wheel which is in the nature of a shield that is automatically extended and restricted by the force of the wind with respect to the cup-shaped blades of the wind wheel, so that the same serves as a governing device for controlling the rotation of the wheel and the apparatus to which the windwheel is attached.

To the attainment of the foregoing and other objects which will present themselves the invention resides in this and other novel features of construction which will hereinafter be definitely described, illustrated and set forth in detail in the accompanying claim.

In the drawings:

Figure 1 is a side elevation of a wind mill in accordance with this invention.

Figure 2 is a top plan view thereof.

Figure 3 is a sectional view on the line 3—3 of Figure 1.

The support or tower of the improvement is indicated by the numeral 1 and is of the ordinary construction. There is passed centrally through the top of the tower and journaled in suitable bearings in said tower the shaft 2 which, in the showing of the drawings has its lower end, above its lower bearing provided with a gear wheel 3 that is in mesh with a larger gear 4 that is mounted on a cross shaft that carries the pulley for the mechanism that is operated by the wheel. The shaft 2, above its upper bearing 5 is fixed to the hub 6 of the body of the windwheel. The body of the wheel is in the nature of a cylinder 7 which is connected to the hub by radiating spokes 8. On the outer face of the cylindrical body 7 there is fixed the blades 8', each of which being curved in the same direction and the outer edges of the blades, at the top and bottom thereof are braced by wing members 9, respectively.

Both above and below the windwheel there is rotatably mounted on the shaft the connecting arms of substantially rectangular members 10. These members have their corners connected by suitable and preferably cross sectionally rounded elements 11 and secured between and extending from one of the corners of the members 10 there are plates or brackets 12 between which there is fixed the inner end of the tail vane 13.

To the connecting rods 11, located laterally of the tail vane 13 there are pivotally secured plates 14 and 15, respectively, the plate 14 being of a length materially greater than that of the plate 15. The plate 14 as a matter-of-fact is of a length at least equalling the distance between two of the corners of the members 10. The plate 14 has pivotally secured to its outer end another plate 16, and there are pivotal rod connections 17 between the free end of the plate 16 and the free end of the comparatively narrow plate 15. The plate 16 is of a length greater than that of the plate 15 and the plates 14 and 16 serve as shields for protecting the majority of the blades or vanes 8' of the windmill against the influence of the current of air which is directed through the remaining blades between the rods 17. The turning of the windwheel will have a tendency to hold the plates that comprise the shield in the position disclosed by Figure 3 of the drawings but an increased velocity of the wind will act against the shield plates 14 and 16 to swing the same to close certain of the blades or vanes of the wind wheel or to the full shielding position disclosed by the dotted lines in Figure 2 of the drawings and in this manner it will be noted that this simple device provides an automatic regulation for the speed of the wheel.

It is thought that the simplicity of the construction and the advantages thereof will be apparent to those skilled in the art to which such invention relates so that further detailed description will not be required, but obviously I do not wish to be restricted to the precise details herein set forth and, therefore, hold myself entitled to make such changes therefrom as fairly fall within the scope of what I claim.

Having described the invention, I claim:

A wind mill comprising upper and lower frames, one positioned above the other in spaced relation and mounted for movement about a vertical axis, members connecting the frames at their corners, a vane secured to the frames, a wind wheel journalled between the frames, shielding plates hinged to a pair of oppositely disposed members and one of said plates of a greater length than the other plate and of a length substantially equal to the distance between a pair of corners of said frames, a third shield plate hinged to the free end of the plate having the greatest length of said first named plates, and spaced rods hinged to the free end of the third plate and to the free end of the first named plate having the shorter length to cause the plates to move in unison for controlling the speed of rotation of the wind wheel during wind currents of varying velocity.

In testimony whereof I affix my signature.

WALTER S. McRAE.